United States Patent [19]
Kato et al.

[11] Patent Number: 5,648,852
[45] Date of Patent: Jul. 15, 1997

[54] LASER BEAM TYPE DISTANCE MEASURING DEVICE

[75] Inventors: Masahiko Kato, Akikawa; Hiroshi Matsuzaki, Hachioji; Tadashi Adachi, Sayama, all of Japan

[73] Assignees: Nissan Motor Co., Ltd., Yokohama; Olympus Optical Co., Ltd., Tokyo, both of Japan

[21] Appl. No.: 546,176

[22] Filed: Oct. 20, 1995

[30] Foreign Application Priority Data

Oct. 20, 1994 [JP] Japan ................................. 6-255487

[51] Int. Cl.$^6$ ........................... G01B 11/14; G01C 3/08
[52] U.S. Cl. .................... 356/375; 356/5.01; 359/216
[58] Field of Search ............................ 356/375, 376,
356/5.01, 5.02, 3.09, 28, 3.11, 429–431;
235/462, 467, 455, 472; 250/235, 236;
359/507, 216, 217

[56] References Cited

U.S. PATENT DOCUMENTS 5,436,728  7/1995  Watanabe ........................ 250/235
5,493,388  2/1996  Adachi ............................. 359/216

*Primary Examiner*—Hoa Q. Pham
*Attorney, Agent, or Firm*—Foley & Lardner

[57] ABSTRACT

A laser beam type distance measuring device comprises a laser beam emitter; a returning laser beam detector; a polygon mirror rotated about a first axis for reflecting a going laser beam from the laser beam emitter toward a remote object and reflecting a returning laser beam from the object toward a given optical track along which the returning laser beam travels to the returning laser beam detector; and a nodding mechanism for pivoting the polygon mirror about a second axis which is perpendicular to the first axis. These parts are housed in a case which has a window opening through which the going and returning laser beams pass. An outwardly swelled transparent cover covers the window opening in such a manner that a depressed inner surface thereof faces toward the polygon mirror in the case. A shielding plate is installed in the case near the polygon mirror to prevent the going laser beam from entering the given optical track.

10 Claims, 4 Drawing Sheets

LASER BEAM TYPE DISTANCE MEASURING DEVICE

BACKGROUND OF THE INVENTION

1. Field of the Invention

The present invention relates in general to devices for measuring a distance and more particularly, to distance measuring devices of a laser beam using type which, for measuring the distance between the device and an object, transmits a laser beam toward the object and detects a returning laser beam which has been reflected by the object. In practical use, the period required for the laser beam to make the round trip is detected. The distance to the object is equal to the one-half of the time elapsed multiplied by the velocity of the laser beam.

2. Description of the Prior Art

In the above-mentioned conventional distance measuring devices, there is a type which generally comprises a case having a window opening covered with a flat glass, a laser beam emitter installed in the case, a returning laser beam detector installed in the case, a four-sided polygon mirror installed in the case and rotated about a first axis for reflecting a going laser beam from the laser beam emitter toward a remote object and reflecting a returning laser beam from the object toward the returning laser beam detector, and a nodding mechanism installed in the case for pivoting the four-sided polygon mirror about a second axis which is perpendicular to the first axis. Both the going laser beam from the polygon mirror and the returning laser beam from the object pass through the flat glass window of the case.

However, due to the nature of the flat glass, it tends to occur that a part of the going laser beam from the polygon mirror is largely reflected by the flat glass toward an optical track along which the returning laser beam travels to the returning laser beam detector. In fact, the reflection of the laser beam by the flat glass becomes severe when, due to the work of the nodding mechanism, the incidence angle of the laser beam to the flat glass increases. Of course, under such condition, a precise measurement of the distance is not achieved due to interference of the going laser beam with the returning laser beam.

SUMMARY OF THE INVENTION

It is therefore an object of the present invention to provide a laser beam type distance measuring device which is free of the above-mentioned drawback.

According to the present invention, there is provided a laser beam type distance measuring device which comprises a laser beam emitter; a returning laser beam detector; a polygon mirror rotated about a first axis for reflecting a going laser beam from the laser beam emitter toward a remote object and reflecting a returning laser beam from the object toward a given optical track along which the returning laser beam travels to the returning laser beam detector; a nodding mechanism for pivoting the polygon mirror about a second axis which is perpendicular to the first axis; a case housing at least the polygon mirror, the case having a window opening through which both the going and returning laser beams pass; an outwardly swelled transparent cover covering the window opening in such a manner that a depressed inner surface thereof faces toward the polygon mirror in the case; and a shielding plate installed in the case near the polygon mirror to prevent the going laser beam from entering the given optical track.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
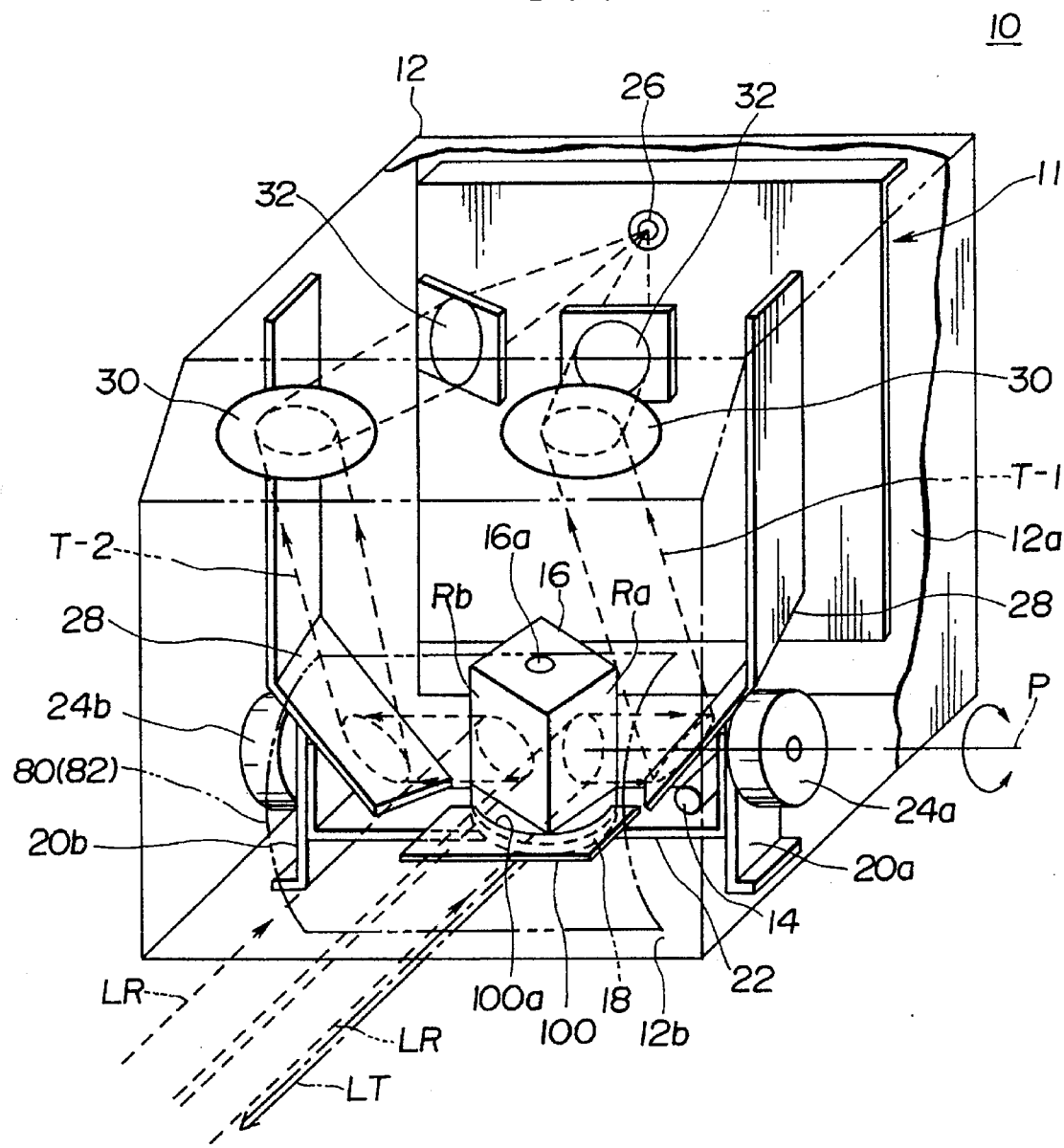
FIG. 1 is a perspective view of a laser beam type distance measuring device according to the present invention.

Referring to FIG. 1 of the drawings, there is shown a laser beam type distance measuring device 10 according to the present invention.

The device 10 comprises generally a transmitter optical section, a scanning optical section, a receiver optical section and a control section 11, which are housed in a case 12.

The case 12 comprises an upper wall, a bottom wall 12b, a front wall, a rear wall 12a and right and left side walls.

As will be described in detail hereinafter, the front wall of the case 12 is formed with an improved window through which both the going and returning laser beams pass.

The transmitter optical section comprises generally a laser diode, a collimating lens, anamorphic prism pair and a beam expansion telescope which are installed in a cylinder to constitute a laser beam emitter 14. A larger diameter laser beam is thus emitted from a laser emitting opening of the laser beam emitter 14 toward the scanning optical section.

Figure 2:
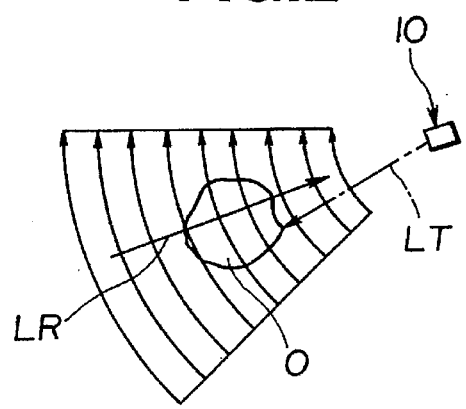
FIG. 2 is a view showing a scanning pattern of a laser beam projected toward an object from the device of the present invention.

The scanning optical section comprises a four-sided polygon mirror 16 which is mounted on and driven by an electric motor 18 to rotate at a given speed about its axis 16a. A nodding mechanism is incorporated with the motor 18 to swing the polygon mirror 16 upward and downward in the drawing. The nodding mechanism comprises a pair of stands 20a and 20b mounted on the bottom wall 12b of the case 12. A nodding plate 22 on which the motor 18 is mounted is pivotally connected at its raised both ends to the stands 20a and 20b. Designated by "P" is a pivot axis which passes through the pivoted portions of the nodding plate 22 and a center of the polygon mirror 16. The pivot axis "P" is perpendicular to the rotation axis 16a of the polygon mirror 16. A step motor 24a is mounted to the stand 20a to stepwisely pivot the nodding plate 22 at a given speed and given intervals. An angle sensor 24b is mounted to the other stand 20b for sensing the angle of the nodding plate 22 relative to the fixed bottom wall 12b of the case 12. When, due to continuous stepwise motion of the step motor 24a, the nodding plate 22 comes to its lowermost angular position, the angle sensor 24b issues a signal to operate the step motor 24a in a manner to jump up the nodding plate 22 to its uppermost angular position. The rotation of the polygon mirror 16 about the rotation axis 16a and the swinging movement of the nodding plate 22 about the pivot axis "P" are synchronized so that the transmitted laser beam "LT", which has been reflected by the polygon mirror 16, scans an object "O" (see FIG. 2) from left to right, top to bottom.

The receiver optical section comprises generally two optical tracks "T-1" and "T-2" (or optical guide ways) through which the returning laser beams "LR", which have been reflected by the object "O", travel to be focused on a returning laser beam detector 26. As shown in the drawing, the two tracks "T-1" and "T-2" are arranged symmetrical with respect to an imaginary plane on which the rotation axis 16a of the polygon mirror 16 runs during the swinging movement of the nodding plate 22. Each track "T-1" or "T-2" comprises one ("Ra" or "Rb") of the four mirror surfaces of the polygon mirror 16, a first inclined fixed mirror 28 arranged beside the polygon mirror 16, a second inclined fixed mirror 30 arranged above the first mirror 28 and a reduction telescope 32 arranged between the second mirror 30 and the returning laser beam detector 26. The reduction telescope 32 is equipped with an interference filter.

During rotation and swinging motion of the polygon mirror 16, the returning laser beams "LR", which have been reflected by the object "O" are directed to and reflected by the neighboring two ("Ra" and "Rb") of the four mirror surfaces of the polygon mirror 16. The laser beams "LR" thus reflected by the polygon mirror 16 are led to the laser beam detector 26 through the respective optical tracks "T-1" and "T-2".

In the present invention, there are further employed the following measures for eliminating the drawback of the above-mentioned conventional distance measuring device.

Figure 3:
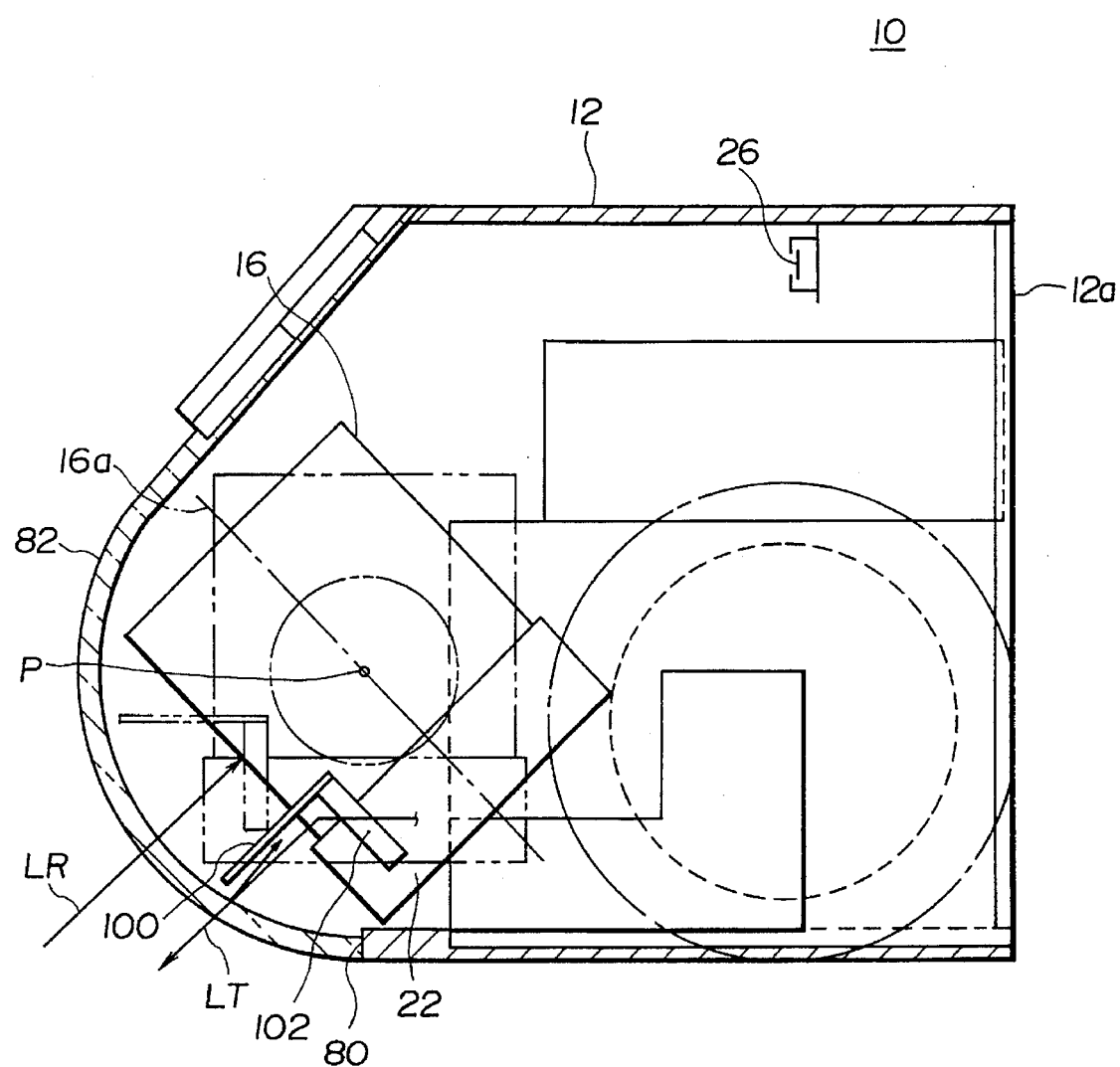
FIG. 3 is a side sectional view of the distance measuring device of the present invention.

That is, as is seen from FIGS. 1 and 3, the front wall of the case 12 is formed near the polygon mirror 16 with a window opening 80 through which both the going and returning laser beams "LT" and "LR" pass.

The window opening 80 is covered with a semicylindrical transparent cover 82 in such a manner that a depressed inner surface thereof faces toward the polygon mirror 16 in the case 12. More specifically, the semicylindrical cover 82 is so arranged as to be concentric with the pivot axis "P" of the nodding plate 22. The cover 82 is constructed of glass, plastic or the like.

As is seen from FIG. 1, the laser beam emitter 14 is positioned below one of the first inclined fixed mirrors 28, so that the going laser beam "LT" emitted from the laser beam emitter 14 is directed to only a lower part of the polygon mirror 16. With this, an upper major part of the polygon mirror 16 can be used for reflecting the returning laser beams "LR" and "LR" toward the respective first inclined fixed mirrors 28.

Figure 5:
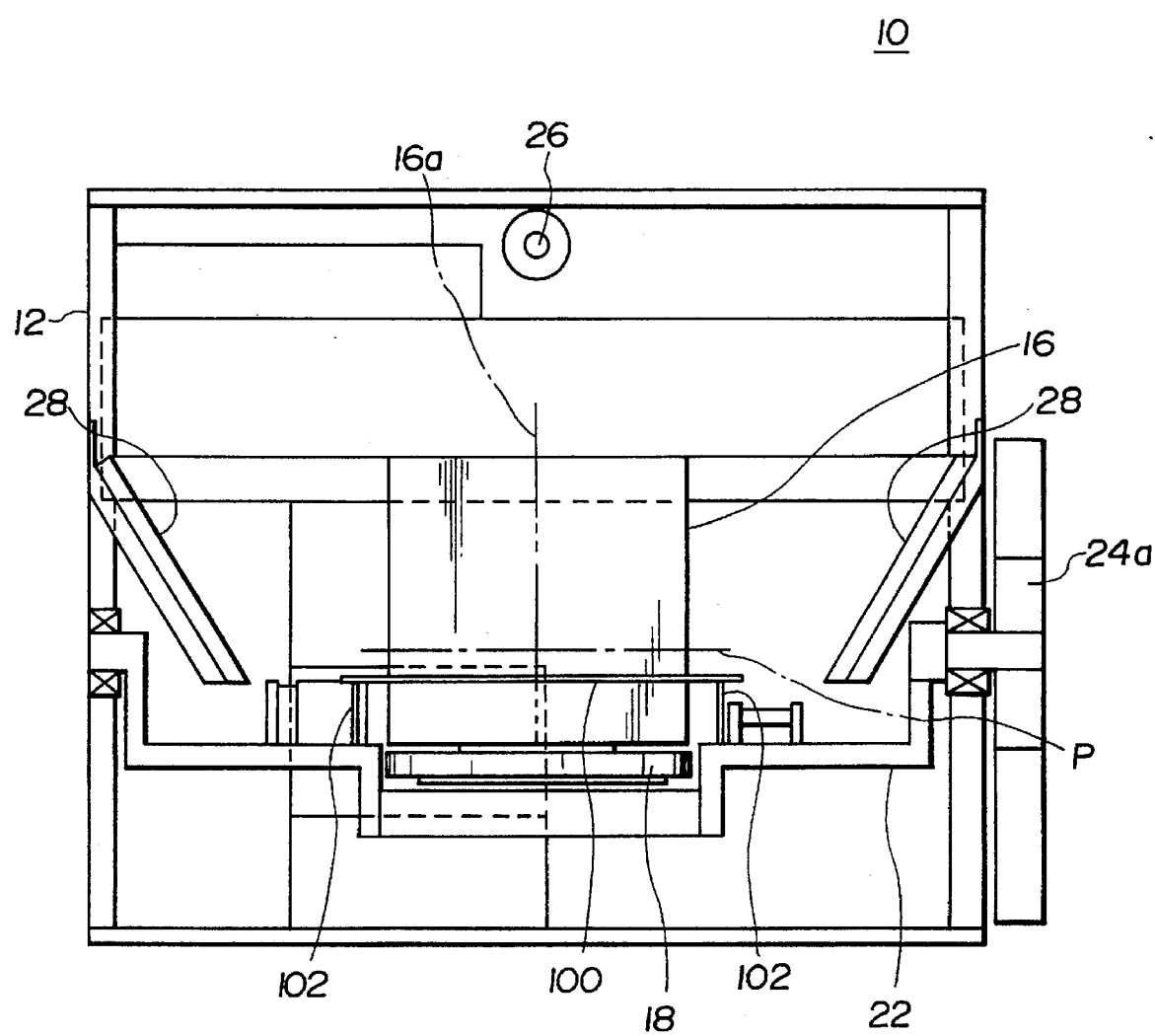
FIG. 5 is a front sectional view of the distance measuring device of the present invention.

As is understood from FIGS. 1, 3 and 5, a horizontally extending shielding plate 100 is fixed through two stands 102 to the nodding plate 22 beside the lower part of the polygon mirror 16. That is, the shielding plate 100 extends perpendicular to the rotation axis 16a of the polygon mirror 16.

Figure 4:
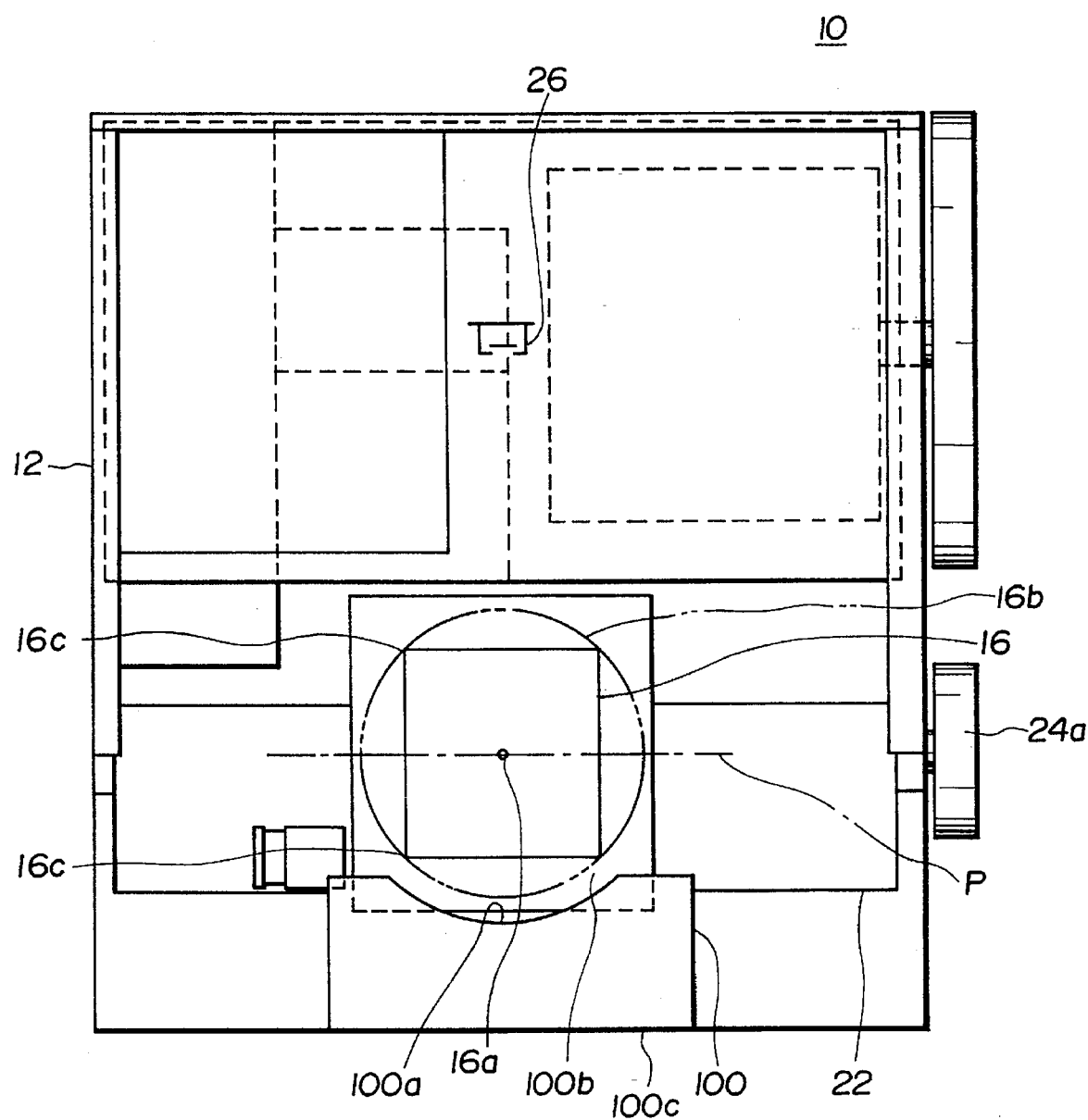
FIG. 4 is a top sectional view of the distance measuring device of the present invention.

As is seen from FIG. 4, the shielding plate 100 is formed at its rear edge with an arcuate recess 100a which is concentric with the rotation axis 16a of the polygon mirror 16. Thus, under rotation of the polygon mirror 16, there is defined an arcuate clearance 100b between the periphery of the arcuate recess 100a and a path 16b along which the four side ridges 16c of the polygon mirror 16 travel. The shielding plate 100 has a straight front edge 100c which extends laterally along an inner surface of the semicylindrical cover 82. Thus, when the nodding plate 22 pivots about its pivot axis "P", the straight front edge 100c of the shielding plate 100 travels upward and downward along the curved or semicylindrical inner surface of the semicylindrical cover 82 while leaving a small clearance therebetween.

In the following, various advantageous phenomena taking place under operation of the distance measurement device of the present invention will be described.

First, as will be understood from FIG. 3, due to provision of the shielding plate 100, the laser beam "LT" coming to the lower part of the polygon mirror 16 from the laser beam emitter 14 is suppressed from entering the optical track of the returning laser beam "LR". This phenomenon becomes much marked when the distance measurement is applied to an object which is placed at a lower-front far position with respect to the distance measuring device 10.

Second, due to the nature of curvature possessed by the semicylindrical cover 82, the reflection of the laser beam by the cover 82 is small as compared with that by a flat glass. Thus, the interference of the going laser beam "LT" with the returning laser beam "LR" is minimized.

Third, since the shielding plate 100 is pivoted together with the nodding plate 22 on which the polygon mirror 16 is mounted, the ratio of the laser beam reflecting area of the polygon mirror 16 where the going laser beam is reflected toward an object to that where the returning laser beam from the object is reflected toward the returning laser beam optical track is kept constant even when the polygon mirror 16 changes its angular position upon pivoting of the nodding plate 22 about the pivot axis "P".

Due to the above-mentioned various advantages, a precise distance measurement is achieved in the present invention.

If desired, the following modifications may be employed in the present invention.

First, a spherical cover may be used in place of the semicylindrical cover 82. That is, the spherical cover is so arranged as to have its center of curvature at the intersection of the rotation axis 16a of the polygon mirror 16 and the pivot axis "P" of the nodding plate 22. In this case, the shielding plate 100 has a convex front edge which extends laterally along a curved inner surface of the spherical cover.

Second, the upper part of the polygon mirror 16 may be used for reflecting the going laser beam toward an object. In this case, the laser beam emitter 14 is positioned above the first inclined fixed mirror 28 and the shielding plate 100 is arranged beside the upper part of the polygon mirror 16. Thus, in this case, a lower major part of the polygon mirror 16 is used for reflecting the returning laser beam toward the respective first inclined fixed mirrors 28.

What is claimed is:

1. A laser beam type distance measuring device comprising:

a laser beam emitter;

a returning laser beam detector;

a polygon mirror rotated about a first axis for reflecting a going laser beam from said laser beam emitter toward a remote object and reflecting a returning laser beam from said object toward a given optical track along which said returning laser beam travels to said returning laser beam detector;

a nodding mechanism for pivoting said polygon mirror about a second axis which is perpendicular to said first axis;

a case housing at least said polygon mirror, said case having a window opening through which said going and returning laser beams pass;

an outwardly swelled transparent cover covering said window opening in such a manner that a depressed inner surface thereof faces toward said polygon mirror in said case; and a shielding plate installed in said case near said polygon mirror to prevent said going laser beam from entering said given optical track.

2. A laser beam type distance measuring device as claimed in claim 1, in which said nodding mechanism includes a nodding plate on which both said polygon mirror and said shielding plate are mounted, said nodding plate being pivoted about said second axis.

3. A laser beam type distance measuring device as claimed in claim 2, in which said shielding plate is formed at its rear edge with an arcuate recess for spacedly receiving said polygon mirror.

4. A laser beam type distance measuring device as claimed in claim 3, in which said shielding plate has a front edge which is shaped analogous to the depressed inner surface of said outwardly swelled transparent cover.

5. A laser beam type distance measuring device as claimed in claim 2, in which said shielding plate is positioned near a lower part of said polygon mirror so that the going laser beam from said laser beam emitter is directed to only the lower part of said polygon mirror and the returning laser beam from said object is directed to an upper major part of said polygon mirror.

6. A laser beam type distance measuring device as claimed in claim 5, in which said shielding plate is connected to said nodding plate through two stands.

7. A laser beam type distance measuring device as claimed in claim 6, in which said shielding plate extends in a direction perpendicular to said first axis.

8. A laser beam type distance measuring device as claimed in claim 1, in which said outwardly swelled transparent cover is a semicylindrical cover which is arranged to be concentric with said second axis.

9. A laser beam type distance measuring device as claimed in claim 1, in which said outwardly swelled transparent cover is a spherical cover which is so arranged as to have its center of curvature at the intersection of said first and second axes.

10. A laser beam type distance measuring device as claimed in claim 1, in which said outwardly swelled transparent cover is constructed of glass or plastic.

* * * * *